United States Patent [19]

Ganzberger et al.

[11] Patent Number: 5,125,495
[45] Date of Patent: Jun. 30, 1992

[54] FEED DEVICE FOR A CORNER FINISHING MACHINE

[75] Inventors: Walter Ganzberger; Gerd Waber, both of Haid, Austria

[73] Assignee: ACTUAl Anlagen- Maschinen- und Werkzeugbau Gesellschaft m.b.H., Haid, Austria

[21] Appl. No.: 583,774

[22] Filed: Sep. 17, 1990

[30] Foreign Application Priority Data

Sep. 18, 1989 [AT] Austria ............... 2163/89

[51] Int. Cl.5 ............................. B65G 47/24
[52] U.S. Cl. ................... 198/345.1; 198/403; 198/410; 414/759; 414/769; 414/771; 414/774
[58] Field of Search ............ 198/345.1, 410, 411, 198/412, 403; 29/559; 269/41, 13; 414/759, 760, 769, 771, 773, 774, 775

[56] References Cited

U.S. PATENT DOCUMENTS 3,536,206 10/1970 Ruddick ............ 198/403 X
3,780,882 12/1973 Wagner ............ 198/403 X
3,937,381 2/1976 Lang et al. ............ 198/345.1 X
5,006,037 4/1991 Bluemle ............ 198/403

Primary Examiner—Joseph E. Valenza
Assistant Examiner—Tuan N. Nguyen
Attorney, Agent, or Firm—Collard & Roe

[57] ABSTRACT

A feed device for a corner finishing machine for finishing frames consists of a framework which supports the frames, a conveyor for longitudinal movement of the frames along the support plane and a pivot device to rotate the frames around a normal pivot axis to the support plane in the area of the finishing tools. In order to achieve reliable, careful support of the frames, the framework forms an inclined support, with a guide rail, interr... ed in the area of the finishing tools, and the pivot device includes two support arms which fit into the break in the guide rail in their extended position. The arms can be pivoted up out of their extended position by an angle that corresponds at least to the greatest corner angle of the frames via a suitable drive.

4 Claims, 7 Drawing Sheets

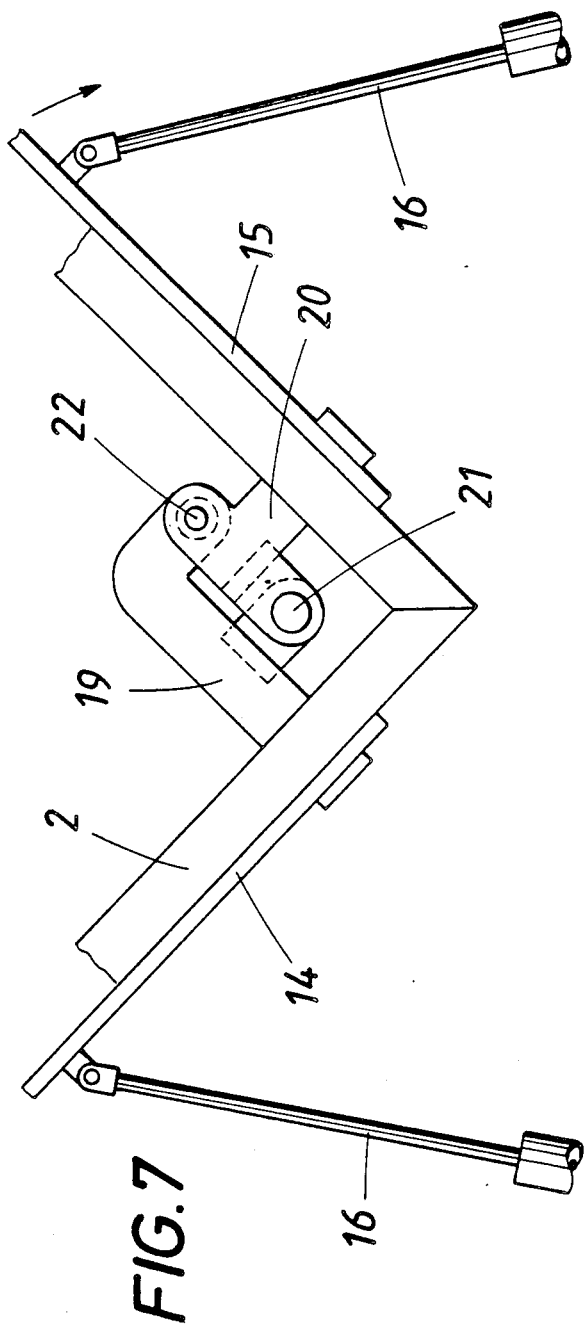
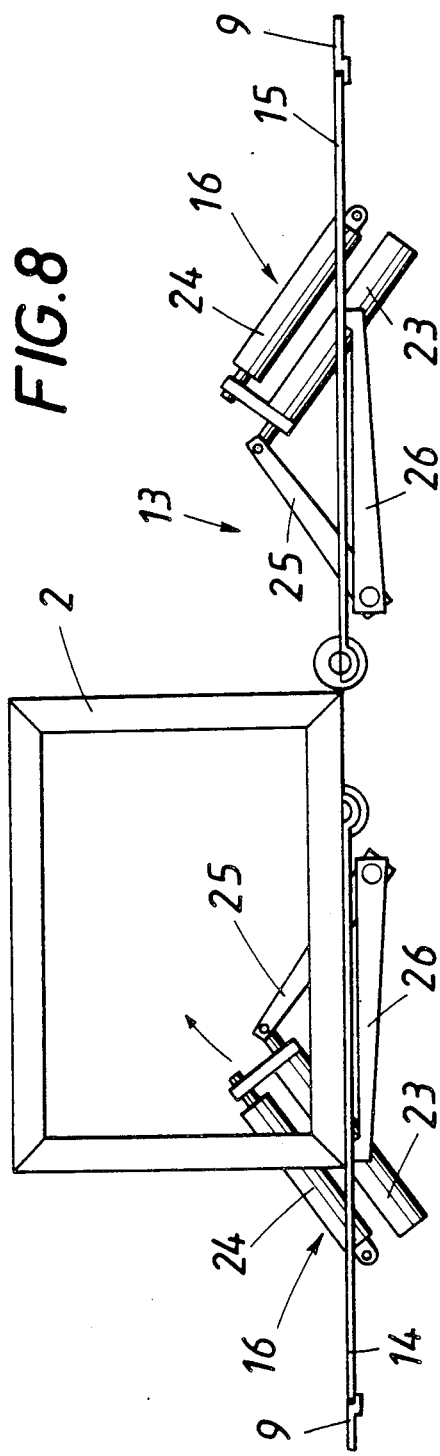

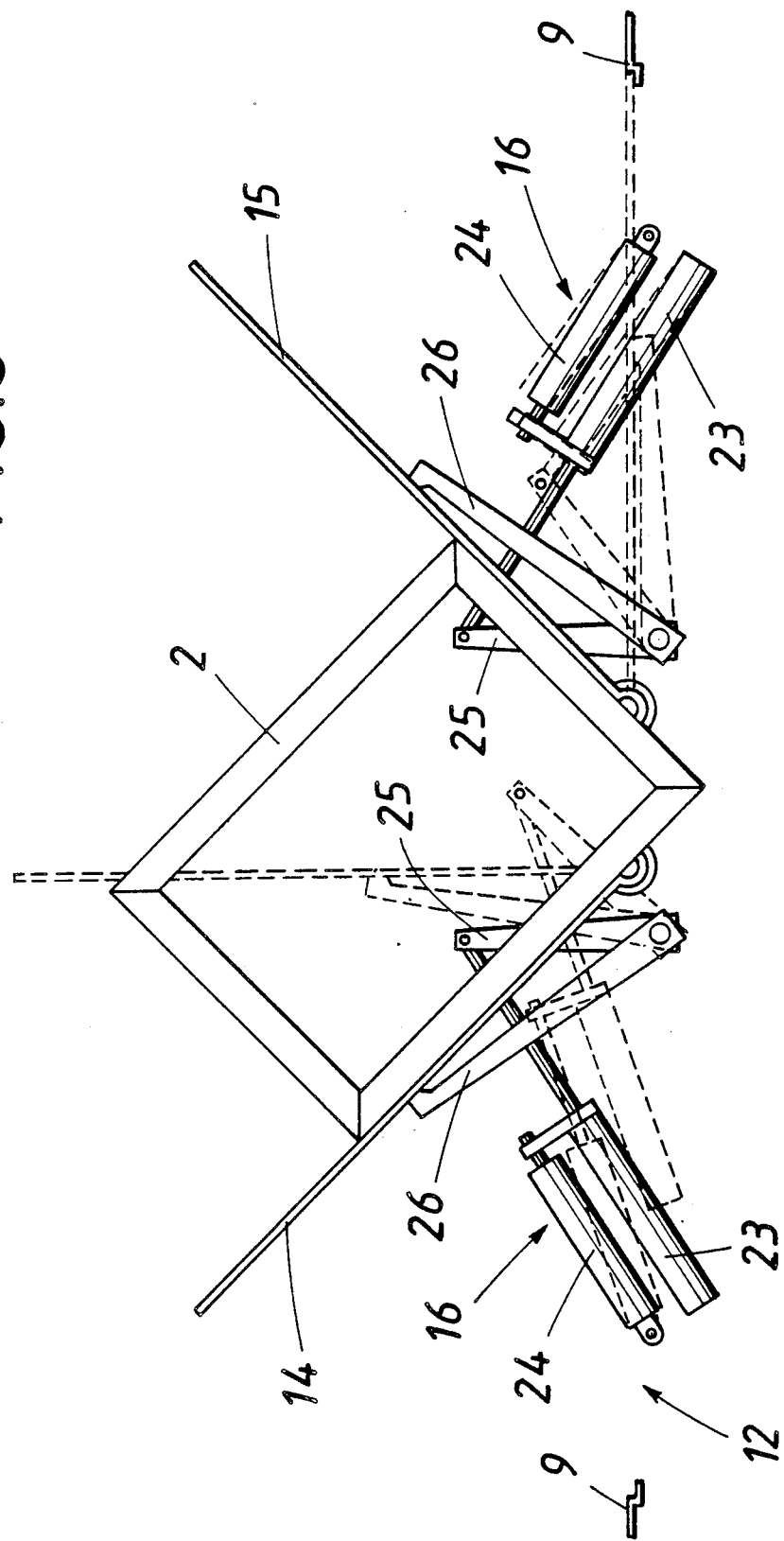

FEED DEVICE FOR A CORNER FINISHING MACHINE

BACKGROUND OF THE INVENTION

The invention relates to a feed device for a corner finishing machine for finishing frames welded together of plastic profiles, especially window frames. More particularly, it relates to such a device having a framework which supports the frames, a conveyor element which moves the frames longitudinally along a support plane and a pivot device which rotates the frames around a pivot axis normal to the support plane in the area of the finishing tools.

In the production of plastic frames (i.e., plastic window and door frames) the welded parts in the frame corners have to be finished after the actual welding process, in order to obtain a qualitatively perfect product. It is practical to carry out such finishing in the miter direction or direction of the weld seam. Since the frames are conveyed in the longitudinal direction of one of their sides, a feed device must be provided for the corner finishing machines, by which the frames can be moved in the longitudinal direction as well as turned for finishing.

The prior art discloses horizontal feed devices in which the conveyor is a carrier which can be moved longitudinally, along guide rails. The pivot device is located in a break in the guide rails in the area of the finishing units or tools. A guide bracket is mounted on springs on rail pieces which are rigidly or adjustably placed. A cross slide works together with this bracket. The frames are pushed by means of the carrier until the corner to be finished is in the break area, whereupon the cross slide presses this frame corner into the guide bracket, while the frame is simultaneously rotated. This positions the frame for finishing, and after finishing it has to be pushed back and aligned parallel to the guide rails, with an additional rotation device. Although, it is possible to bring all the corners of a frame into the desired working position, one after the other, this feed device requires a significant amount of room and construction effort and only slow movement cycles are possible. In addition only frames supported in a horizontal position could be moved forward, due to the tilt and rotation stress which occurs.

SUMMARY OF THE INVENTION

It is therefore an object of the present invention to eliminate the aforementioned drawbacks of the prior art and to provide a feed device which guarantees firm frame support even during rotation.

It is a further object of the present invention to provide such a device which is relatively space-saving and affords uncomplicated construction.

It is yet a further object of the invention to provide a device which allows corner finishing of frames placed approximately vertically without any undue stress on the welds.

These and other related objects are attained according to the invention by a feed device having a framework which forms an inclined, almost vertical support, with a lower guide rail for the frames, interrupted in the area of the finishing units. A pivot device comprised of two support arms fits into the break in the guide rail in their extended or horizontal position. The support arms are mounted to pivot at their adjacent end areas, and can be pivoted up out of their extended position by an angle that corresponds at least to the greatest corner angle of the frames, by suitable drive means. These support arms, which can be pivoted individually and/or together, can support the frame over a large surface, and therefore offer a secure hold for the frame during the rotation movement and the finishing process, even though it is oriented vertically. This method allows careful handling of the frame, without the risk of damage.

The frame is brought along into the area of the finishing units with a conveyor, while the support arms are pivoted down (i.e., to assume a horizontal position). After the support arm, which is to the rear in the transport direction, has been brought up, the frame is pushed forward to rest against this support arm in the upright position. Now the frame can be pivoted and rotated as desired, by turning the support arms together and in the same direction. Now the support arm, which is the front one in the transport direction, and which is still in the up position, is pivoted back, the frame is moved back one side length with the conveyor, until the next corner is in the finishing area. The pivoting process is then repeated by pivoting up the rear support arm, pivoting the two arms together, etc.

After all corners have been finished, the support arms go back into their extended position, the frame is pushed out of the finishing area with the conveyor, and the next frame is brought to the finishing units. In spite of precise support and guidance of the frames, the design for this efficient pivoting device is quite simple. The device also saves space, so that sufficient room remains for the use of several finishing units.

Each arm is preferably moved by two piston/cylinder units. Their strokes should correspond to pivot movements of the support arms adapted to half the corner angle of the frames. These piston/cylinder units in series, with their precisely defined strokes, result in very definite pivot movements of the support arms, so that if the strokes are selected appropriately, or if the lever translation is selected accordingly, the shafts pivot up exactly by the angle which is equal to half the corner angle of the frame. As a result, they align the frame diagonal to this corner, and then, when the other unit is also moved out, extend the pivot movement to the full corner angle, and tilt the frame around the corresponding corner. The turning device therefore does not require any complicated control mechanisms and results in the necessary pivot movements simply by targeted use of the piston/cylinder units.

In order to ensure precise concurrent movement when the support arms are pivoted together, the support arms can be coupled with each other in the angle position, according to the invention, via a synchronization device, so that the arms necessarily pivot together and always support the frame perfectly during pivoting, even if one or the other piston units does not function correctly. The synchronization device can, of course, be turned on and off, so that it remains possible to pivot the support arms individually.

A variety of drive connections can be used as synchronization devices. For example, a piston/cylinder unit which attaches directly to connecting struts of the support arms is most advantageous, but a chain or gear wheel drive which couples shaft or cam parts of the support arm bearing, or a rod linked to connecting struts of the support arms, or a similar device, can certainly be used. Various couplings and locking devices can be provided to turn the synchronization devices on and off; it is most practical if these are activated by piston/cylinder units.

In a further advantageous embodiment, the support arms are mounted to pivot around a common axis, by means of brackets. The brackets can be locked together representing a particular angle of the support arms that corresponds to the corner frame angle. With a common pivot axis of the support arms, relative movement between the frame and the support arms is prevented when the frame is pivoted. Locking of the brackets together results in a reliable synchronization device.

BRIEF DESCRIPTION OF THE DRAWINGS

Other objects and features of the present invention will become apparent from the following detailed description considered in connection with the accompanying drawing. It is to be understood, however, that the drawing is designed as an illustration only and not as a definition of the limits of the invention.

In the drawing, wherein similar numbers represent similar figures on different drawings, the object of the invention is shown only schematically, with the figures showing the following:

FIG. 7 is a front elevational view of the pivot device, shown in FIGS. 5 and 6, with brackets locked and partially rotated.

FIG. 8 is a front elevational view of an alternate embodiment of the pivot device utilizing a pair of two piston/cylinder units.

FIG. 9 is a front elevational view of the pivot device shown in FIG. 8, depicting in solid line, the frame partially rotated with both arms partially vertical, and, in phantom line, the left arm totally vertical and the right arm extended or horizontal.

DETAILED DESCRIPTION OF THE PREFERRED EMBODIMENTS

Figure 1:
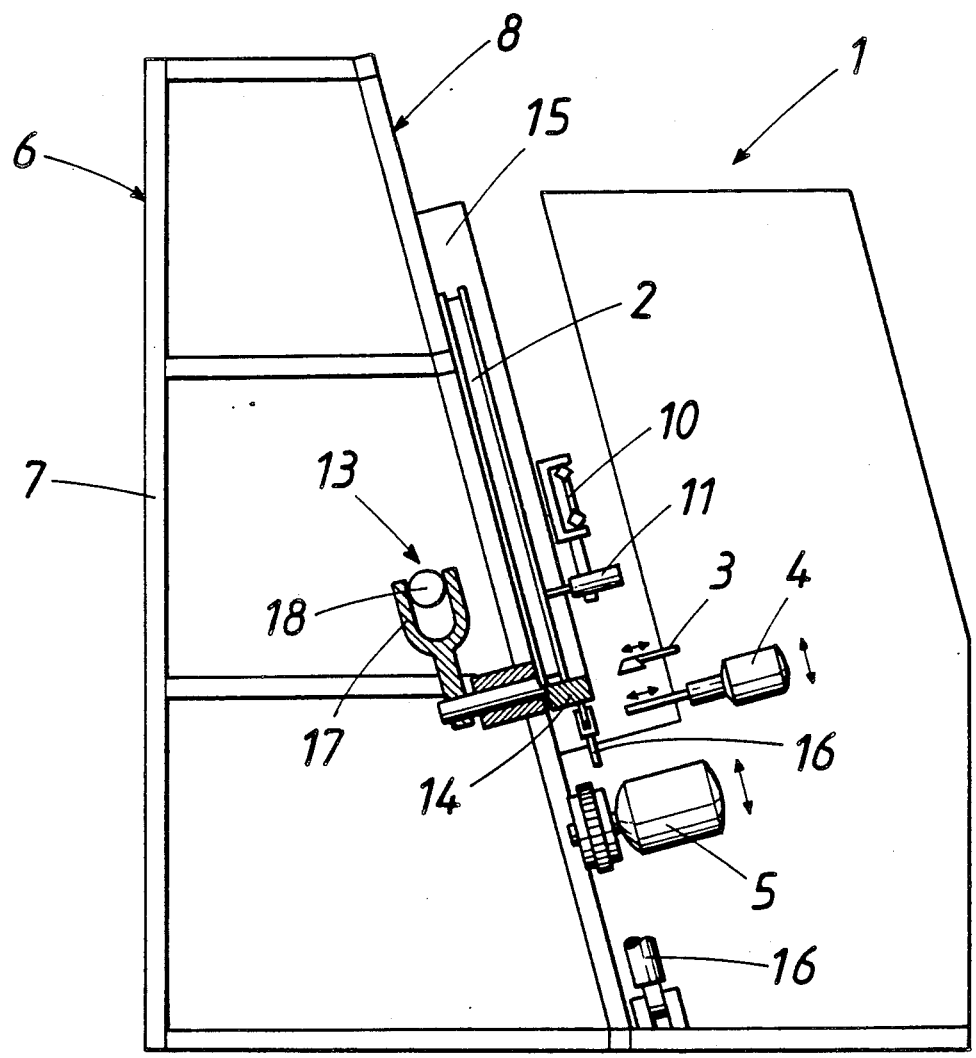
FIG. 1 is a side elevational view, in part section, of a frame feeding device embodying the present invention.

Referring now in detail to the drawings and, in particular FIG. 1, there is illustrated a corner finishing machine 1, embodying the present invention, for finishing frames 2 made of plastic profiles. It is equipped with various finishing units or tools, i.e., a weld seam trimming blade 3, a seal groove router 4, an outside corner router 5, and similar devices. It has a feed device 6 for conveying frames 2 and positioning them in a working position.

Figure 2:
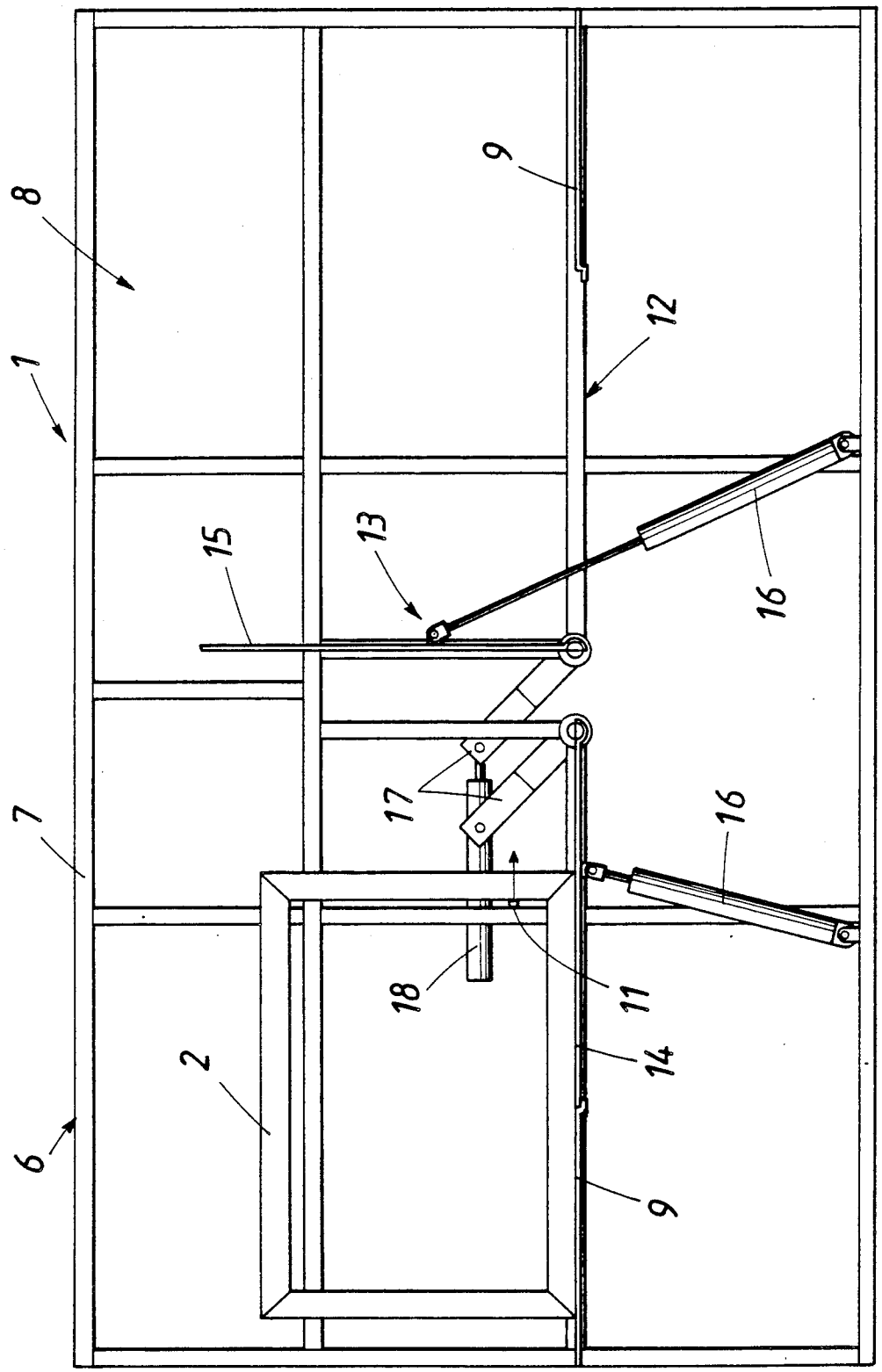
FIG. 2 is a front elevational view of the frame shown in FIG. 1.

This feed device 6 consists of a framework 7, which forms an approximately vertical support 8 with a lower guide rail 9 (see FIG. 2). The guide rail 9 supports a longitudinal conveyor 10 having a carrier 11, which in turn supports frames 2 for longitudinal movement along guide rails 9. In the area of finishing units 3, 4, 5, there is a break 12 in guide rail 9, in which a pivot device 13, which rotates the frames around a pivot axis normal to the support plane is, located.

Pivot device 13 comprises two support arms 14, 15, which are mounted to pivot on framework 7 in the area of their adjacent ends. They can be pivoted up from an extended position, in which they align with and fit into break 12 in support rail 9, around a pivot angle that corresponds to one corner angle of frame 2, up to 90°, by means of pivoting drives 16. By pivoting these support arms 14, 15 individually or together, frame 2 can be rotated into the desired working position with simultaneous support of the frame sides, as well as be tilted from one arm to the other.

Figure 3:
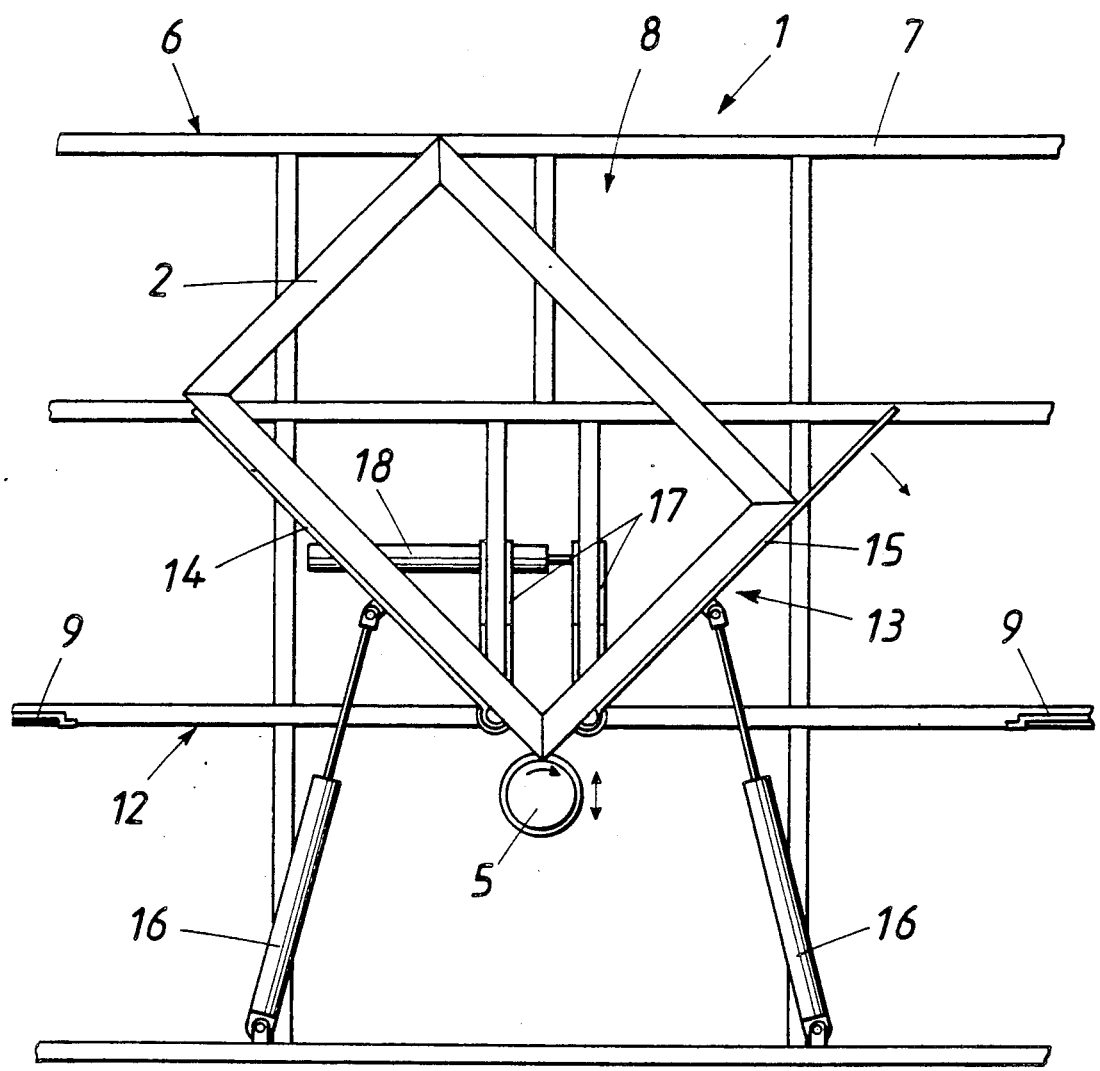
FIGS. 3 and 4 are fragmentary front elevational views of the device showing the frame in two positions as it rotates around the finishing machines.

Feed device 6 works in the following manner: frame 2, resting on guide rail 9 on one of its sides, is moved along to pivot device 13 (FIG. 2) by means of the carrier 11 of conveyor 10. The front support arm 14 aligns with guide rail 9, so that frame 2 can be pushed from guide rail 9 onto this support arm 14. Support arm 15 is pivoted up 90° and frame 2 is moved forward until it is completely within the angle formed by the two support arms 14, 15. Now both support arms 14, 15 are pivoted in the same direction, until the working position, for example a position of the frame in which it is inclined 45°, has been reached (FIG. 3).

Figure 4:
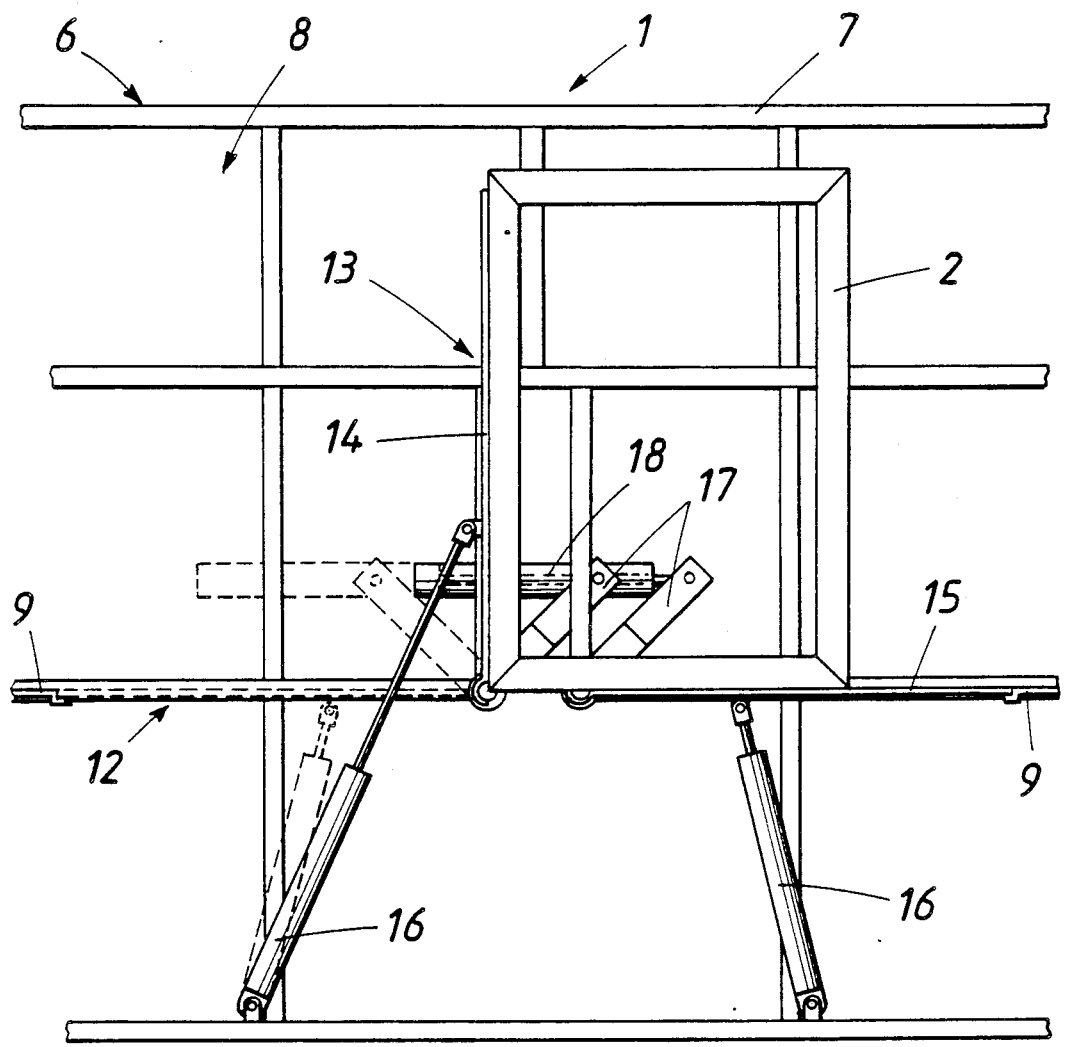

In this position the frame is clamped (in a known manner not shown in greater detail) and finished in the corner area, which is indicated by the use of outside corner router 5. After finishing, support arms 14, 15 are rotated further until support arm 15 aligns horizontally with guide rail 9 and support arm 14 is in a vertical position. This pivoting causes frame 2 to turn 90° from when it first arrived. After the support arm 14 is pivoted back to the extended horizontal position and frame 2 is pushed back to its initial position by means of the carrier (phantom lines in FIG. 4), support arm 15 can pivot up and pivot device 13 is ready to rotate frame 2 again. In this manner, all the frame corners can be brought to the finishing units, one after the other, and fully automatic finishing of frame 2 can be achieved. After finishing the last frame corner, the frame is moved on past the area of the pivoting device 13, by means of conveyor 10, the first support arm 14 returns to its extended horizontal position and a new frame 2 can be brought into position.

Pursuant to the embodiment according to FIGS. 1 to 4, support arms 14, 15 are connected with each other by means of connector struts 17 angled at 45°, with a piston/cylinder unit 18 supported between them, so that a synchronization device for the pivot movement of the two support arms 14, 15 is created. This piston/cylinder unit 18 permits coupled movement of the two connector struts 17 and also the support arms 14, 15.

Figure 5:
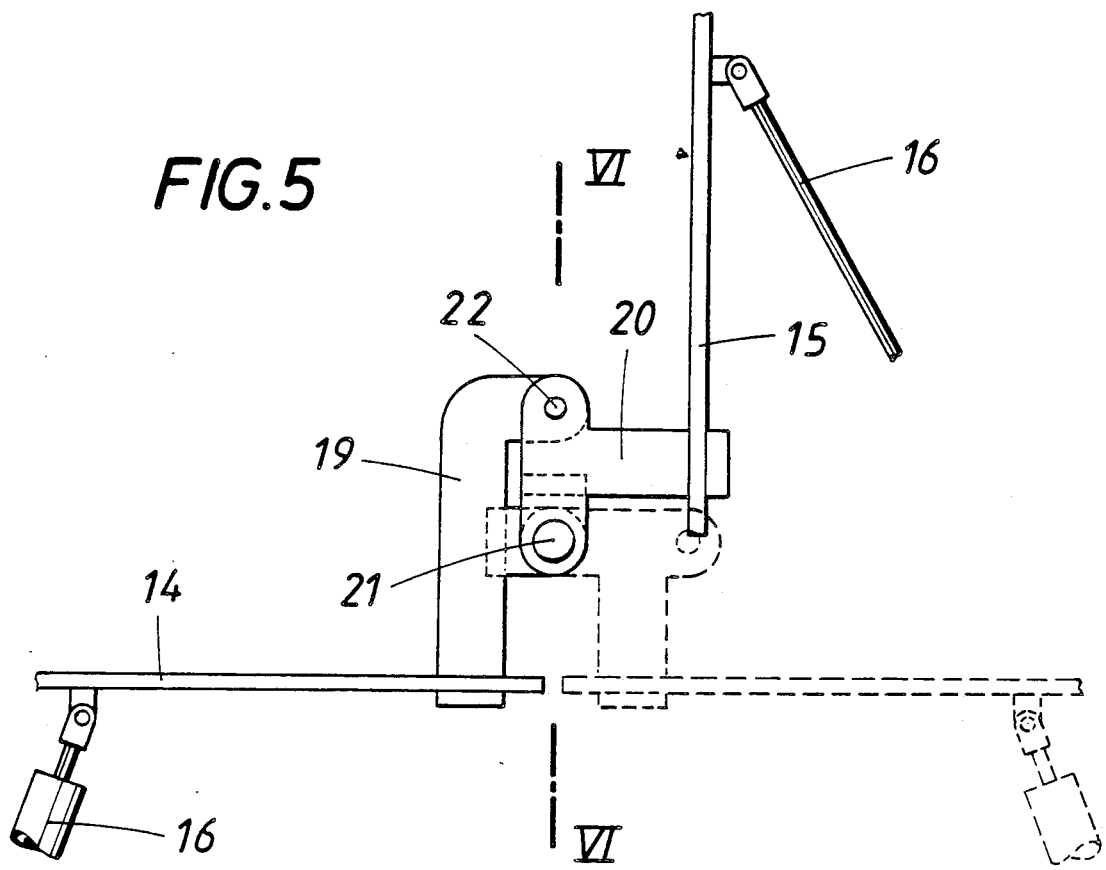
FIG. 5 is a front elevational view of an alternate embodiment of the pivot device showing, in solid line, the left arm in the extended, horizontal position and the right arm upright, and in phantom line, the right arm in horizontal position.
Figure 6:
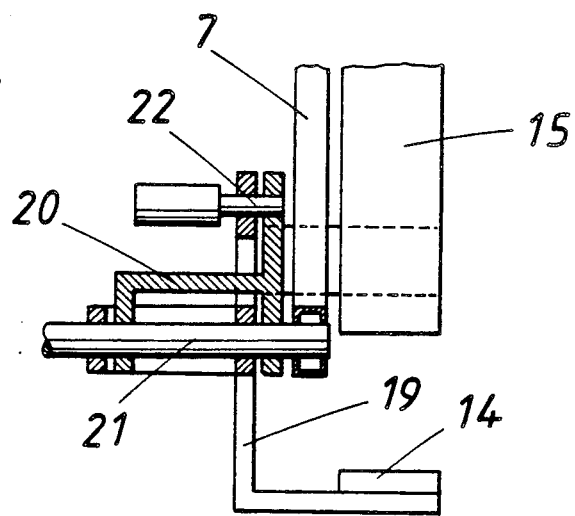
FIG. 6 is a cross-sectional view taken along line VI—VI of FIG. 5.

Pursuant to the embodiment according to FIGS. 5 to 7, support arms 14, 15 are mounted to pivot together around a common axis 21, by means of brackets 19, 20. Brackets 19 and 20 can be locked together by means of a bolt 22 which can be moved in and out. This allows independent pivoting of support arms 14 and 15 when the lock is open, and guarantees combined, synchronized pivoting of the support arms 14 and 15 when the lock is moved in, in the angle position. The common pivot axis 21 also ensures that no relative movement of frame 2 respect to with the support arms 14 and 15 occurs during pivoting, as can occur when two different pivot axes are present (i.e., FIGS. 1-4).

Pursuant to the embodiment according to FIGS. 8 and 9, two piston/cylinder units 23, 24 in series are provided for each of the support arms 14, 15, with their stroke corresponding to a 45° pivot angle of the support arms 14, 15 in each case. To save space, the piston/cylinder units 23, 24 are linked to a pivot lever 25, which is mounted on framework 7 behind support 8. This lever engages the support arms 14, 15 by means of an actuator arm 26 which is pivoted by the lever and pivots the support arms. Depending on whether one or both piston/cylinder units 23, 24 are actuated, a 45° or 90° pivot movement of the support arm or arms 14, 15 takes place.

The feed device according to the invention is characterized by its precise guidance of the frames during longitudinal movement and pivoting of the frames, which are in an approximately vertical position, and offers a large area of firm support for the frames, especially during rotation, so that excess stress on the frame during the course of corner finishing is reliably avoided.

Thus, while only several embodiments of the present invention have been shown and described, it is obvious that many changes and modifications may be made thereunto without departing from the spirit and scope of the invention.

What is claimed is:

1. A feed device for a corner finishing machine or the like, for finishing frames in a work zone, comprising:
    a framework which supports the frames in an inclined plane, said framework including a guide rail interrupted by a break in the area of said work zone;
    conveyor means supported by said framework for conveying a respective one of said frames longitudinally along said guide rail supporting one of the sides of the frame;
    pivot means for rotating the frame along a pivot axis normal to said support plane in said work zone, said pivot means including two support arms, each of which has an end disposed adjacent to the end of the other support arm, and which are supported for pivotal movement about at least one fixed axis for movement between a horizontal position in which said arms traverse said break and are aligned with said guide rail, and an angled position in which said arms are pivoted upwardly by an angle corresponding at least to the greatest corner angle of the frames; and
    drive means for effecting the movement of said support arms between said horizontal and angled positions thereof, said drive means comprising two pairs of drive cylinders, a respective pair of drive cylinders being coupled to each support arm, the drive cylinders of each pair being connected in series, and each drive cylinder being independently controlled having a piston stroke proportional to half the corner angle to which the angled position corresponds so that each support arm can be pivoted to half the angled position by activation of one of said drive cylinders and pivoted to the angled position by activation of said pair of drive cylinders.

2. A feed device for a corner finishing machine or the like, for finishing frames in a work zone, comprising:
    a framework which supports the frames in an inclined plane, said framework including a guide rail interrupted by a break in the area of said work zone;
    conveyor means supported by said framework for conveying a respective one of said frame longitudinally along said guide rail supporting one of the sides of the frame;
    pivot means for rotating the frame around a pivot axis normal to said support plane in said work zone, said pivot means including two support arms, each of which has an end disposed adjacent to the end of the other support arm, and which are supported for pivotal movement about at least one fixed axis for movement between a horizontal position in which said arms transverse said break and are aligned with said guide rail, and an angled position in which said arms are pivoted upwardly by an angle corresponding at least to the greatest corner angle of the frame;
    drive means coupled to the pivot means for effecting the movement of said support arms between said horizontal and angled positions thereof; and
    synchronization means capable of being selectively activated coupling of said support arms to each other for synchronous movement in said angled position thereof.

3. The feed device of claim 2, wherein said synchronization means includes a pair of connecting struts, each of which is coupled at one end to one of said support arms and a drive cylinder coupled to an opposite end of said connecting struts.

4. A feed device for a corner finishing machine or the like, for finishing frames in a work zone, comprising:
    a framework which supports the frames in an inclined plane, said framework including a guide rail interrupted by a break in the area of said work zone;
    conveyor means supported by said framework for conveying a respective one of said frames longitudinally along said guide rail supporting one of the sides of the frame;
    pivot means for rotating the frame around a pivot axis normal to said support plane in said work zone, said pivot means including two support arms, each of which has an end disposed adjacent to the end of the other support arm, and which are supported for pivotal movement about said adjacent ends for movement between a horizontal position in which said arms transverse said break and are aligned with said guide rail, and an angled position in which said arms are pivoted upwardly by an angle corresponding at least to the greatest corner angle of the frame;
    a pair of bracket arms, each of which is coupled to one of said support arms and the bracket arms being pivotally connected to each other so that said support arms pivot about a common axis;
    locking means for locking said bracket arms in a predetermined angled position corresponding to the corner angle of the frame; and
    drive means coupled to said pivot means for effecting the movement of said support arms between said horizontal and angle position thereof.

* * * * *